United States Patent Office

Re. 28,060
Reissued July 2, 1974

28,060
WATER-IN-OIL EMULSION TYPE BLASTING AGENT

George R. Cattermole, Ballwin, Mo., Austin M. Cummings, Martinsburg, W. Va., and William M. Lyerly, Hagerstown, Md., assignors to E. I. du Pont de Nemours and Company, Wilmington, Del.

No Drawing. Original No. 3,674,578, dated July 4, 1972, Ser. No. 12,126, Feb. 17, 1970. Application for reissue Oct. 5, 1973, Ser. No. 403,866
Int. Cl. C06b *1/04*
U.S. Cl. 149—2 10 Claims

Matter enclosed in heavy brackets [ ] appears in the original patent but forms no part of this reissue specification; matter printed in italics indicates the additions made by reissue.

ABSTRACT OF THE DISCLOSURE

A water-in-oil emulsion type blasting agent containing inorganic oxidizing salt, nitrogen-base salt, water, water-insoluble organic fuel that forms a continuous oil phase, lipophilic emulsifier and gas bubbles.

BACKGROUND OF THE INVENTION

This invention relates to blasting agents in the form of a water-in-oil emulsion and, more particularly, to such blasting agents comprising an inorganic oxidizing salt, nitrogen-base salt and gas bubbles incorporated in the explosive composition.

Ammonium nitrate-fuel oil compositions, often referred to as ANFO, are an inexpensive source of energy for blasting but have serious shortcomings. These compositions cannot be used in wet boreholes unless they are packaged in waterproof containers or further processed. Furthermore, and more importantly, the explosive action and density of ANFO explosives are not sufficiently high for many commercial uses. On the other hand, thickened water-bearing explosives have been successful commercially because they can be used under a variety of conditions, e.g., in boreholes containing water, and they have good densities and detonation velocities. These products typically comprise an oxidizing component, e.g., ammonium nitrate, a fuel component dispersed or dissolved in an aqueous medium, which is thickened, usually by guar gum and, where premium performance is required, generally contain sensitizers. The incorporation of thickeners, such as guar gum, and sensitizers such as TNT or aluminum in the explosive composition increases the cost of the blasting agent and, generally, results in products that do not adequately perform in small diameter holes or are undesirable from other standpoints. Accordingly, there is a need in the explosives industry for a low-cost, high-velocity explosive composition that is readily formulated, water-resistant, safe to handle, and yet sufficiently sensitive to allow propagation in small diameter holes and, preferably, is pumpable from a source of supply to a borehole. This invention provides a water-in-oil emulsion type blasting agent meeting the above-mentioned needs.

SUMMARY OF THE INVENTION

The present invention provides a novel blasting agent in the form of a water-in-oil emulsion comprising inorganic oxidizing salt; nitrogen-base salt of an inorganic oxidizing acid and a base selected from the group consisting of: (1) acyclic nitrogen bases having no more than two hydrogen atoms bonded to the basic nitrogen and up to three carbon atoms per basic nitrogen, and (2) phenylamines; water; water-insoluble organic fuel that forms a continuous oil phase in the blasting agent; lipophilic emulsifier for said fuel capable of forming and maintaining a stable water-in-oil emulsion, and 5 to 50% by volume, gas bubbles incorporated in said blasting agent.

The combination of nitrogen-base salt and gas bubbles in the water-in-oil emulsion, containing oxidizing salt and fuel, results in a blasting agent that is safe to handle yet especially sensitive to detonation and will propagate at high velocity in boreholes having a diameter as small as one or two inches. Quite surprisingly, the present blasting agents have detonation velocities comparable to conventional water gels or slurry explosives containing substantial quantities of high explosive. The blasting agents of the present invention are pourable or pumpable, if desired, and can vary in consistency over a wide range from slightly viscous to a thick, tough, self-sustaining mass.

It is significant to note that in order for the composition to function in small diameter holes, e.g. of the order of two inches, it is necessary that sufficient gas bubbles and nitrogen-base salt are incorporated therein. The gas bubbles can be incorporated by any suitable means such as injecting a gas into the composition, mechanically beating air into the blasting agent or adding particulate material thereto that entraps air. Preferably, the gas is usually incorporated in the explosive by adding to it solid air-carrying material, such as microballons or silicious glass. The gas bubbles contained in the blasting agent are present in amounts of from about 5 to 50% by volume and the nitrogen-base salt is present in amounts of from 3 to 30% by weight of the total composition. The nitrogen-base salt increases the sensitivity of the composition so that such compositions can be used effectively in very small boreholes, for example, about two inches or less in diameter, and reliably detonate and propagate and produce high velocities of detonation.

The blasting agents of this invention can be formed by mixing an aqueous solution of an inorganic oxidizing salt(s) alone or together with nitrogen-base salt with organic fuel containing a lipophilic emulsifier, agitating the mixture until a thickened emulsion is formed and then incorporating gas, by the addition of gas-carrying material, e.g., microballons or injection of air, and obtaining a blasting agent in the form of a water-in-oil emulsion.

PREFERRED EMBODIMENTS OF THE INVENTION

The inorganic oxidizing salt used in the blasting agent of the present invention is usually present in amounts of from about 35 to 85%, preferably 45 to 75%, by weight of the total composition. Examples of inorganic oxidizing salts include ammonium, alkali metal and alkaline earth metal nitrates, and perchlorates as well as mixtures of two or more such salts. Representative compounds are ammonium nitrate, ammonium perchlorate, sodium nitrate, sodium perchlorate, potassium nitrate, potassium perchlorate, magnesium nitrate, magnesium perchlorate and calcium nitrate. Preferably, the inorganic oxidizing salt present in the water phase in the composition is ammonium nitrate alone or, in some instances, in combination with up to about 35% sodium nitrate.

The amount of water added to the composition is from about 10 to 35% by weight, and preferably, from about 15 to 25%. The water, containing inorganic oxidizing salt and nitrogen-base salt, forms the discontinuous aqueous phase of the water-in-oil emulsion blasting agent.

The nitrogen-base salt employed in the blasting agent can be derived from inorganic bases such as hydrazines, but preferably they are derived from amines, especially aliphatic amines and phenylamines. Phenylamines, as used herein refer to compounds having one carbocyclic aromatic ring to which is bonded at least one, and preferably one or two, primary amino groups. Salts of primary, secondary and tertiary amines meeting the aforementioned requirements can be used and the base moiety can bear substituents other than carbon, hydrogen and the base nitrogen that are inert with the system. The oxidizing acid moiety can be that of any of the strong inorganic oxidizing acids, preferably mineral acids, for example, salts of nitric, nitrous, chloric and perchloric acid. Excellent explosive properties are obtained when the blasting agents of the present invention are used in boreholes having diameters of about two inches. Such superior performance is due largely to the presence of the nitrogen-base salt.

Representative examples of nitrogen-base salts or amine nitrates that can be incorporated in the present blasting agent include inorganic salts such as hydrazine nitrate, dinitrate and perchlorate; salts of aliphatic amines such as monomethylamine nitrate, nitrite, chlorate and perchlorate, ethylene diamine dinitrate and diperchlorate, dimethylamine nitrate, trimethylamine nitrate, ethylamine nitrate, propylamine nitrate, ethanolamine nitrate, guanadine nitrate, urea nitrate and salts of phenylamines such as aniline nitrate, chlorate and perchlorate, p-chloroaniline nitrate and phenylene diamine dinitrate. Of the aforementioned salts saturated aliphatic amine nitrates containing up to three carbon atoms, for example, monomethylamine nitrate, trimethylamine nitrate, ethylenediamine dinitrate and ethanolamine nitrate are particularly preferred because of the case of formulation of explosives therewith and the outstanding explosive properties such as velocity and strength of the resulting compositions. Mixtures of the aforementioned salts can be used and generally, in such salt mixtures, the overall oxygen balance of the salt should be more positive than −150%.

The nitrogen-base salt can be incorporated in the composition in substantially pure form; however, preferably it is provided as a crude reaction mixture of the base substantially neutralized with the oxidizing acid, either formed separately in aqueous medium then blended with the remainder of the constituents of the explosive or formed in situ in the presence of one or more of such constitutents.

The total amount of nitrogen-base salt used varies with the particular composition and can range from about 3 to 30% by weight of the total composition. Preferably, about 7 to 20% by weight of the nitrogen-base salt is incorporated in the water-in-oil emulsion blasting agent.

The organic fuel that is used to form the continuous oil phase is characterized as being insoluble in water and is a liquid or solid, or blends thereof, which are liquid at the time of manufacture. The term oil means any hydrocarbon or substituted hydrocarbon that functions as a fuel in the explosive reaction. Organic fuels forming the oil phase can be present in the composition individually or in combination. Suitable organic compounds that function as fuels forming the oil phase of the emulsion are hydrocarbon oils such as diesel oil, paraffin wax, tall oil, long-chain fatty acids such as oleic acid, nitroalkanes such as nitropropane, aromatic hydrocarbons such as benzene, substituted aromatic hydrocarbons such as nitrobenzene and also silicone oils and the like. It is believed that the continuous phase of oil surrounds the crystals of inorganic oxidizing salt, for example, ammonium nitrate, and retards crystal growth. Organic fuels that are especially preferred are those having viscosities at 100° F. between 30 and 300 cps. Generally, the organic fuel forming the oil phase of the blasting agent is present in amounts sufficient to obtain an oxygen balance between about −30 to +10%, and preferably about −10 to 10%. Generally, the organic fuel is present in amounts of about 2 to 12% and preferably about 4 to 8%, based on the weight of the composition.

It is also necessary to use a lipophilic emulsifier in admixture with the organic fuel forming the continuous phase in an amount sufficient to form and maintain a stable water-in-oil emulsion. Lipophilic emulsifiers which can be used include salts of long-chain fatty acids such as calcium, magnesium or aluminum oleate; sorbitan esters such as sorbitan monolaurate or monooleate; ethylene oxide condensates of fatty acids such as Armour "Ethofat" manufactured by Armour Industrial Chemical Co., Division of Armour and Co., aromatic sulfonic acids such as linear dodecylbenzene sulfonic acid; alkyolamides such as Swift "F-221" manufactured by Chemicals Department, Swift and Co.; triethanolamine oleate ("Dominol TO-100") manufactured by Dominion Products, Inc.; tall oil amides such as the tall oil amide of tetraethylene penta-amide, "EZ-Mul," manufactured by Boroid Division of National Lead Co. Generally, at least about 0.25%, by weight emulsifier, based on the weight of the total composition, is present in the blasting agent to form a stable emulsion. Larger amounts of emulsifier can be used in the composition without detrimental effect since it functions as a fuel. However, from a practical standpoint, based primarily on economics, usually not more than about 4%, and generally not less than about 1%, by weight, emulsifier is used. For most applications the amount of emulsifier present in the composition is from about 1 to 2% by weight.

Any suitable means for incorporating gas bubbles in the present blasting agent can be used. For example, gas bubbles can be incorporated by dispersing gas in the blasting agent by direct injection, such as by air or nitrogen injection, or the gas can be incorporated by mechanically agitating the composition and beating air therein. However, preferably, incorporation of gas bubbles is accomplished by the addition of particulate material such as air-carrying solid material, for example, phenolformaldehyde microballoons, glass microballoons or silicious glass. The amount of gas bubbles incorporated in the blasting agent results in a composition containing about 5 to 50% and preferably 10 to 35% gas bubbles, by volume.

Alternatively, if desired, conventional fuels can be added to the composition as auxiliary fuels. Any conventional fuel that is stable can be used. Examples of auxiliary metallic fuels, which are especially preferred, are aluminum, magnesium, ferrosilicon, ferrophosphorus, as well as mixtures thereof. Other finely-divided fuels such as coal, sulfur, sugars, vegetable meals or other forms of finely-divided carbon can be used. The total amount of fuel in the composition, e.g. auxiliary and organic, is adjusted so that the total composition has an oxygen balance of from about −30 to +10% and, preferably the oxygen balance is between about −10 and +0%.

The following specific examples are given for a clearer understanding of the inveniton. These examples are illustrative only and are not to be construed as limiting the underlying principles and scope of the invention.

EXAMPLES 1–5

Paraffin, corvus oil and the lipophilic emulsifying agent were heated in the amounts indicated to about 120° F. to form a liquid and then added to a turbine mixer. Ammonium nitrate, sodium nitrate, amine nitrate (when added) and water were heated in the amounts indicated to about 140° F. and subsequently added as an aqueous solution to the mixer. The hot ingredients were agitated to thoroughly mix the composition and form a water-in-oil emulsion wherein oil was the continuous phase. Glass microballoons were added to the emulsion while it was being agitated and, thus, uniformly distributed throughout the explosive. The compositions were poured in three- and two-inch diameter portions for detonation.

| | Example | | | | |
|---|---|---|---|---|---|
| | 1 | 2 | 3 | 4 | 5 |
| Ammonium nitrate, percent | 60.0 | 57.0 | 53.5 | 56.0 | 51.4 |
| Water, percent | 18.0 | 18.0 | 18.0 | 18.0 | 18.0 |
| Sodium nitrate, percent | 15.0 | 15.0 | 15.0 | 15.0 | 15.0 |
| Monomethylamine nitrate, percent | | | | 4.0 | 8.6 |
| Ethylenediamine dinitrate, percnet | | 3.0 | 6.5 | | |
| Glass microballons/cwt., percent | 3.0 | 3.0 | 3.0 | 3.0 | 3.0 |
| Corvus oil, percent | 2.0 | 2.0 | 2.0 | 2.0 | 2.0 |
| Paraffin, percent | 3.0 | 3.0 | 3.0 | 3.0 | 3.0 |
| "EZ-Mul,, (Tall oil amide of tetraethylene pentaamine), percent | 2.0 | 2.0 | 2.0 | 2.0 | 2.0 |
| Density (g./cc.) | 1.29 | 1.29 | 1.29 | 1.29 | 1.29 |
| Detonation velocity [1] (m./s.): | | | | | |
| 3-inch | 5,255 | 5,442 | 5,442 | 5,442 | 5,442 |
| 2-inch | Fail | 4,618 | 4,918 | 4,618 | 4,916 |

[1] At 40° F., with air confinement.

It can be seen from the above table that the compositions described in Examples 2 to 5 that contain amine nitrates detonated at 2-inch diameters and the detonation velocities of these compositions were higher than the composition without amine nitrate that failed to detonate at 2-inch diameters.

EXAMPLE 6

The procedure described above in Example 5 was repeated except that 8.6% of trimethylamine nitrate was substituted for monomethylamine nitrate. Portions of the composition were loaded at two- and three-inch diameters and detonated. The composition detonated in each instance with detonation velocities of the order of those given in Example 5.

We claim:

1. A blasting agent in the form of a water-in-oil emulsion comprising inorganic oxidizing salt, nitrogen-base salt of [an inorganic oxidizing] *nitric* acid and a base selected from the group consisting of (1) acyclic nitrogen bases having no more than two hydrogen atoms bonded to the basic nitrogen and up to three carbon atoms per basic nitrogen, and (2) phenylamines, water-insoluble organic fuel that forms a continuous oil phase in the blasting agent, lipophilic emulsifier for said fuel capable of forming and maintaining a stable water-in-oil emulsion, and 5 to 50%, by volume, gas bubbles incorporated in said blasting agent.

2. The product of claim 1 wherein the organic fuel, forming the continuous oil phase is a hydrocarbon.

3. The product of claim 2 wherein the nitrogen-base salt is an amine nitrate.

4. The product of claim 3 containing solid air-carrying material containing gas bubbles.

5. The product of claim 4 containing 3 to 30% aliphatic amine nitrates containing up to 3 carbon atoms.

6. The product of claim 5 containing solid air-carrying material in an amount sufficient to obtain 10 to 35%, by volume, gas bubbles in the composition.

7. The product of claim 4 wherein the amine nitrate is monomethylamine nitrate.

8. The product of claim 4 wherein the amine nitrate is ethylenediamine dinitrate.

9. The product of claim 4 wherein the lipophilic emulsifier is a tall oil amide of tetraethylene peta-amine.

10. The product of claim 4 wherein the inorganic oxidizing salt is ammonium nitrate.

References Cited

The following references, cited by the Examiner, are of record in the patented file of this patent or the original patent.

UNITED STATES PATENTS

| | | | |
|---|---|---|---|
| 3,770,552 | 11/1973 | Tomic | 149—2 |
| 3,765,964 | 10/1973 | Wade | 149—2 |
| 3,356,547 | 12/1967 | Berthmann et al. | 149—92 X |
| 3,431,155 | 3/1969 | Dunglinson et al. | 149—47 |
| 3,471,346 | 10/1969 | Lyerly | 149—47 |
| 3,409,484 | 11/1968 | Minnick | 149—92 X |
| 3,459,608 | 8/1969 | Ludolphy et al. | 149—92 X |
| 3,447,978 | 6/1969 | Bluhm | 149—2 |

BENJAMIN R. PADGETT, Primary Examiner

P. A. NELSON, Assistant Examiner

U.S. Cl. X.R.

149—47, 92, 21

PO-1050
(5/69)

UNITED STATES PATENT OFFICE
CERTIFICATE OF CORRECTION

Patent No. Re. 28,060 Dated July 2, 1974

Inventor(s) George R. Cattermole, Austin M. Cummings and William M. Lyerly

It is certified that error appears in the above-identified patent and that said Letters Patent are hereby corrected as shown below:

Column 5, line 41, after "phenylamines," insert --water,--
Column 6, line 20, "peta-amine" should read --penta-amine--.

Signed and sealed this 29th day of October 1974.

(SEAL)
Attest:

McCOY M. GIBSON JR.
Attesting Officer

C. MARSHALL DANN
Commissioner of Patents